(12) United States Patent
Yakar et al.

(10) Patent No.: US 8,816,831 B2
(45) Date of Patent: *Aug. 26, 2014

(54) PAIRING PLC DEVICES

(71) Applicant: Sigma Designs Israel S.D.I Ltd., Tel Aviv (IL)

(72) Inventors: Eran Yakar, Herzliya (IL); Ronald Bruce Sterenson, Ra'anana (IL)

(73) Assignee: Sigma Designs Israel S.D.I. Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,278

(22) Filed: Sep. 16, 2013

(65) Prior Publication Data

US 2014/0016713 A1    Jan. 16, 2014

Related U.S. Application Data

(63) Continuation of application No. 12/701,637, filed on Feb. 8, 2010, now Pat. No. 8,552,844.

(51) Int. Cl.
*G05B 11/01*    (2006.01)

(52) U.S. Cl.
USPC ............... 340/12.32; 340/13.23; 340/12.4; 455/41.2; 455/41.3

(58) Field of Classification Search
CPC ... H04L 63/08; H04L 67/306; H04W 76/021; H04W 8/24; G01R 27/2605; G01N 1/20; G01N 277/26; G05B 15/02; H02J 4/00; H02K 5/225; H04B 3/54

USPC .......... 340/12.4, 12.32, 13.23; 455/41.2, 41.3
See application file for complete search history.

(56) References Cited

U.S. PATENT DOCUMENTS

| 8,249,504 | B2 * | 8/2012 | Fujii | ............................ 455/41.2 |
| 2006/0062143 | A1 * | 3/2006 | Bibby et al. | .................. 370/225 |
| 2007/0085696 | A1 * | 4/2007 | Ha et al. | .................... 340/825.22 |
| 2007/0093990 | A1 * | 4/2007 | Tarantola et al. | ............. 702/186 |
| 2007/0120953 | A1 | 5/2007 | Koga et al. | |
| 2007/0271398 | A1 * | 11/2007 | Manchester et al. | .......... 709/249 |
| 2008/0231111 | A1 * | 9/2008 | Hazani et al. | ..................... 307/3 |
| 2009/0227206 | A1 * | 9/2009 | Tada et al. | .................... 455/41.2 |
| 2010/0080306 | A1 | 4/2010 | Fukuda | |

FOREIGN PATENT DOCUMENTS

EP    1833229    9/2007

OTHER PUBLICATIONS

European Search Report for corresponding EP application 1153516.7 mailed on May 30, 2011.

* cited by examiner

*Primary Examiner* — Omer S Khan
(74) *Attorney, Agent, or Firm* — Eitan, Mehulal & Sadot (57) ABSTRACT

A method for pairing a first power line communication device with a second power line communication device is disclosed, the method includes the first device triggering a pairing initiating state responsive to sensing a connection of a data cable with the second device; entering an appropriate pairing initiation state, the pairing initiation state being either an add device state or a join device state; and performing pairing with the second device.

6 Claims, 8 Drawing Sheets

PAIRING PLC DEVICES

CROSS-REFERENCE TO RELATED APPLICATIONS

This application is a continuation application claiming benefit from U.S. patent application Ser. No. 12/701,637 filed 8 Feb. 2010, which is hereby incorporated in its entirety by reference.

FIELD OF THE INVENTION

The present invention relates to power line communication devices generally and, in particular, to elements which enable a device to join a network.

BACKGROUND OF THE INVENTION

Power line networks are becoming increasingly common. Such networks are formed of devices (known as power line communication (PLC) devices) which communicate digital data over the in-building power lines and, as such, reduce the amount of wiring in a building.

There are a number of standards for power line networks, the most recent being the G.hn standard. Each one defines how the devices should operate and communicate with one another and with external networks. Since power lines extend beyond the reach of a single premises, thereby enabling neighboring networks to hear one another, it is imperative that the devices know to which network they belong. To this end, a "pairing" process was designed, in which a new PLC device "pairs" with another PLC device that is connected to the network, and receives an encryption key from that device. The current pairing mechanism requires that the encryption key be exchanged within a predefined time period (usually 2 minutes) from the time that the pairing is initiated.

The pairing process is usually initiated by depressing a switch on the PLC device. Usually, the user is instructed to press the switch for 2 seconds. A shorter or longer duration of the switch depression may not properly enable the pairing process.

Once the pairing process is initiated in the first PLC device, the user needs to repeat the process in the other devices on the network within a predefined time period—usually within 2 minutes. PLC devices that are installed in remote locations of the building may require more time to access and the allowed time period for completing the pairing process may not be sufficient.

Furthermore, once the pairing process is initialized, the PLC device will share its encryption key with any other device on the network if the other device has been initialized for pairing during the allowed time period. Thus, devices on neighboring networks that are within communication reach of the pairing device can retain the encryption key if they also happen to be initialized to pair at the same time.

SUMMARY OF THE PRESENT INVENTION

There is provided, in accordance with an embodiment of the present invention, a method for pairing a first power line communication device with a second power line communication device, the method includes the first device triggering a pairing initiating state responsive to sensing a connection of a data cable with the second device; entering an appropriate pairing initiation state, the pairing initiation state being either an add device state or a join device state; and performing pairing with the second device.

According to an embodiment of the present invention, the method includes the device in the join device state passing an identifier to the device in the add state over the data cable and the device in the add state agreeing to the performing only with a device having the identifier.

According to an embodiment of the present invention, the data cable is an Ethernet cable.

According to an embodiment of the present invention, the method includes passing a network key along the data cable from the first device to the second device.

There is provided, in accordance with an embodiment of the present invention, a power line communication device including a power line communication unit; a sensor to sense a data cable connection with a second power line communication device; and a pairing unit to enter an appropriate pairing initiation state upon triggering of the pairing initiating state responsive to receiving an indication from the sensor, the pairing initiation state being either an add device state or a join device state.

According to an embodiment of the present invention, the data cable connection is an Ethernet cable connection.

According to an embodiment of the present invention, the sensor is an Ethernet link sensor.

According to an embodiment of the present invention, the pairing unit comprises a data unit to pass a device identifier, if the device is in a join device state, or to receive a device identifier if the device is in an add state along the data cable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that a physical connection between two power line communication (PLC) devices may provide "hands-free pairing". The physical connection may be any suitable type of connection. In accordance with a preferred embodiment of the present invention, the physical connection may be provided by connecting together "pass-through connectors". In accordance with an alternative preferred embodiment of the present invention, the physical connection may be provided by a cable connection.

Figure 1A:
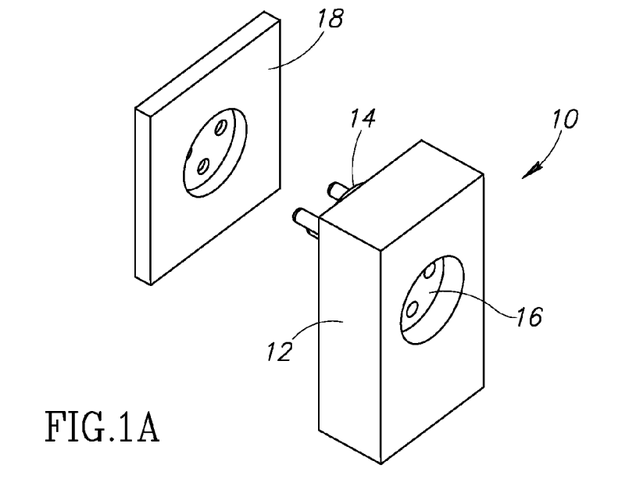
FIGS. 1A and 1B are isometric and schematic illustrations, respectively, of a prior art pass-through connector.
Figure 1B:
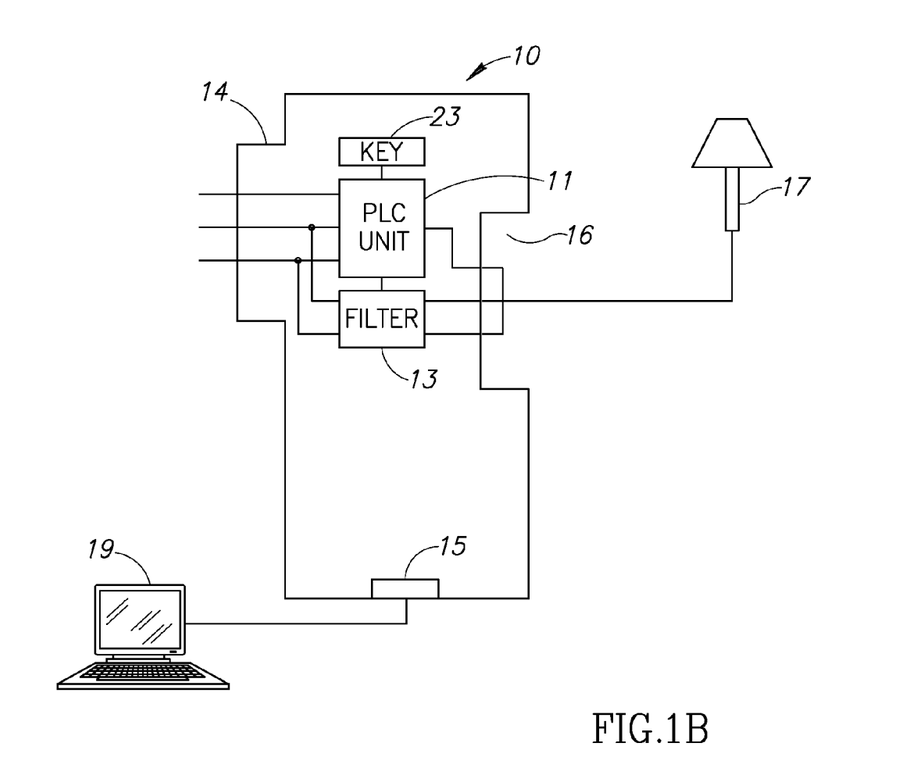

Reference is now made to FIGS. 1A and 1B, which illustrate an exemplary PLC device 10 isometrically (FIG. 1A) and schematically (FIG. 1B). Device 10 may comprise a housing 12, a plug 14, an outlet 16, and a PLC unit 11. Via a data connector 15, PLC unit 11 may connect to a computing device 19 and may provide communication for computing device 19 with other PLC-connected devices across the power lines of the premises.

Device 10 may use plug 14 to connect to the power lines (for power and for communication) via a wall socket (or power outlet) 18. Because the PLC device utilizes wall socket 18, many PLC devices provide additional outlet 16 (a "pass-through connection") connected to a filter 13 to provide filtered AC power to non-PLC devices. Additional outlet 16 may have a further advantage in that it may filter any noise caused by the non-PLC device connected thereto, thereby keeping the noisy non-PLC device from adding noise to the power line network, which noise may degrade the quality of communication over the power lines. Filter 13 may be a low pass filter such that only the low AC power frequency (in the range of 50-60 Hz) may pass through it. As the PLC signals are concentrated in frequencies above 2 MHz, the low AC power frequency should not affect them.

Applicants have realized that not only non-PLC devices may utilize additional outlet 16. A PLC unit may also be plugged into outlet 16, at least temporarily, and this physical connection may be utilized for the pairing process.

Figure 2A:
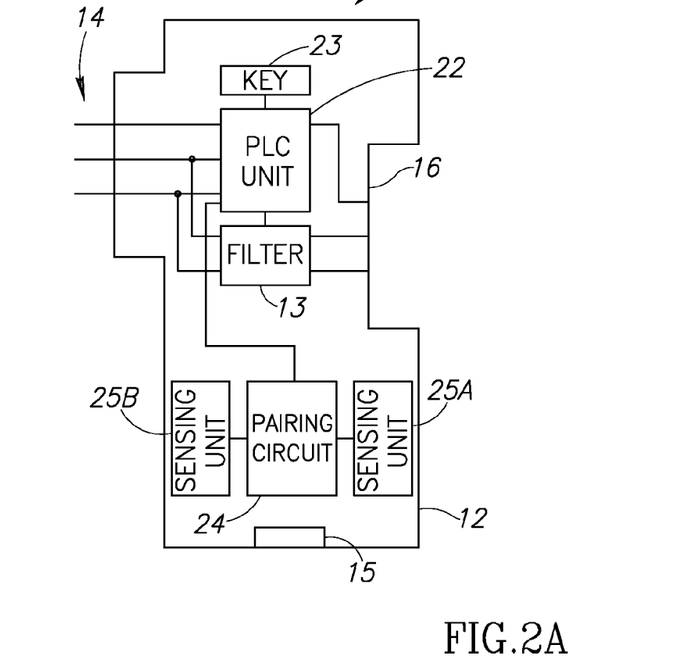
FIG. 2A is a schematic illustration of an improved pass-through connector, constructed and operative in accordance with a preferred embodiment of the present invention.

Reference is now made to FIG. 2A, which details a pass-through PLC device 20, constructed and operative in accordance with a preferred embodiment of the present invention. PLC device 20 may comprise housing 12, plug 14, outlet 16 and filter 13, as in device 10. In FIG. 2A, the PLC unit is labeled 22.

In accordance with a preferred embodiment of the present invention, PLC device 20 may also comprise a pairing circuit 24 and two sensing units 25A and 25B. Sensing units 25 may detect proximity between two adjacent PLC devices 20 such that pairing circuit 24 may determine when two PLC devices 20 are paired. As described in more detail hereinbelow, sensing units 25 may also be located so as to indicate to pairing circuit 24 which device 20 is closest to wall socket 18, since the inner device may become the master which will transfer the network key (stored in a storage unit 23) to the outer device. For example, the A location may be near a front surface of housing 12 close to outlet 16 and the B location may be near a back surface of housing 12 close to plug 14.

Sensing units 25 may be any suitable device which can sense proximity, such as electrical proximity sensors, reed switches controllable by magnets or micro switches depressed by mechanical pressure (the latter may stick out from housing 12 and may only be depressed when another PLC device 20 is pressed against it).

In another embodiment, sensing units may be capable of sensing transmissions, such as RFID units or coils that receive and transmit. Such units may be set to respond only when they sense very strong transmissions, such as only occur when two PLC units 22 are very close to each other.

Figure 2B:
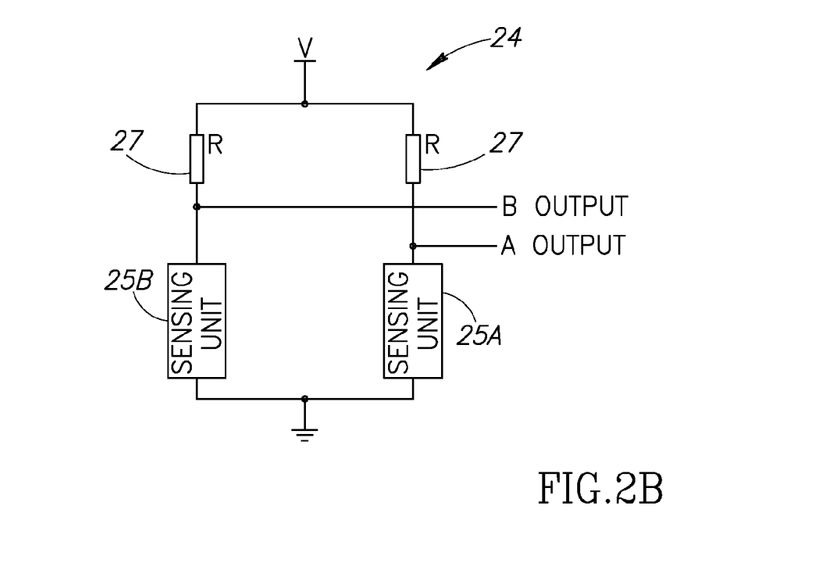
FIG. 2B is a circuit diagram illustration of a sensing unit for the connector of FIG. 2A.

Reference is now made to FIG. 2B, which illustrates the elements of pairing circuit 24 connected to sensing units 25A and 25B. Each sensing unit 25 may be serially connected to a resistor 27 and the two combinations may be connected in parallel to each other, between an input voltage V and ground. There may be two output signals, each measuring the voltage level across one sensing unit 25.

Accordingly, pairing circuit 24 may provide a multi-mode output, where one mode may indicate that sensing unit 25A has been activated, a second mode may indicate that sensing unit 25B has been activated, a third mode may indicate that both sensing units 25 are not activated and a fourth mode may indicate that both sensing units are activated. Thus, pairing circuit 24 may indicate to PLC unit 22 which a sensing unit 25, if any, has been activated.

Figure 3A:
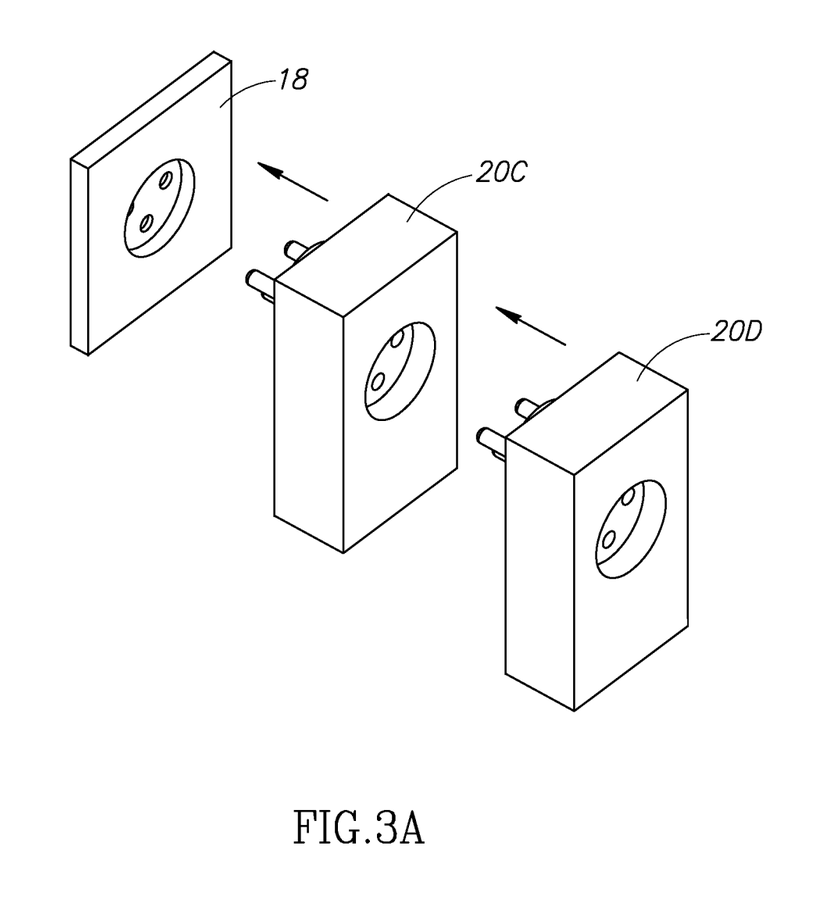
FIG. 3A is an isometric illustration of connecting together two pass-through connectors of FIG. 2A.
Figure 3B:
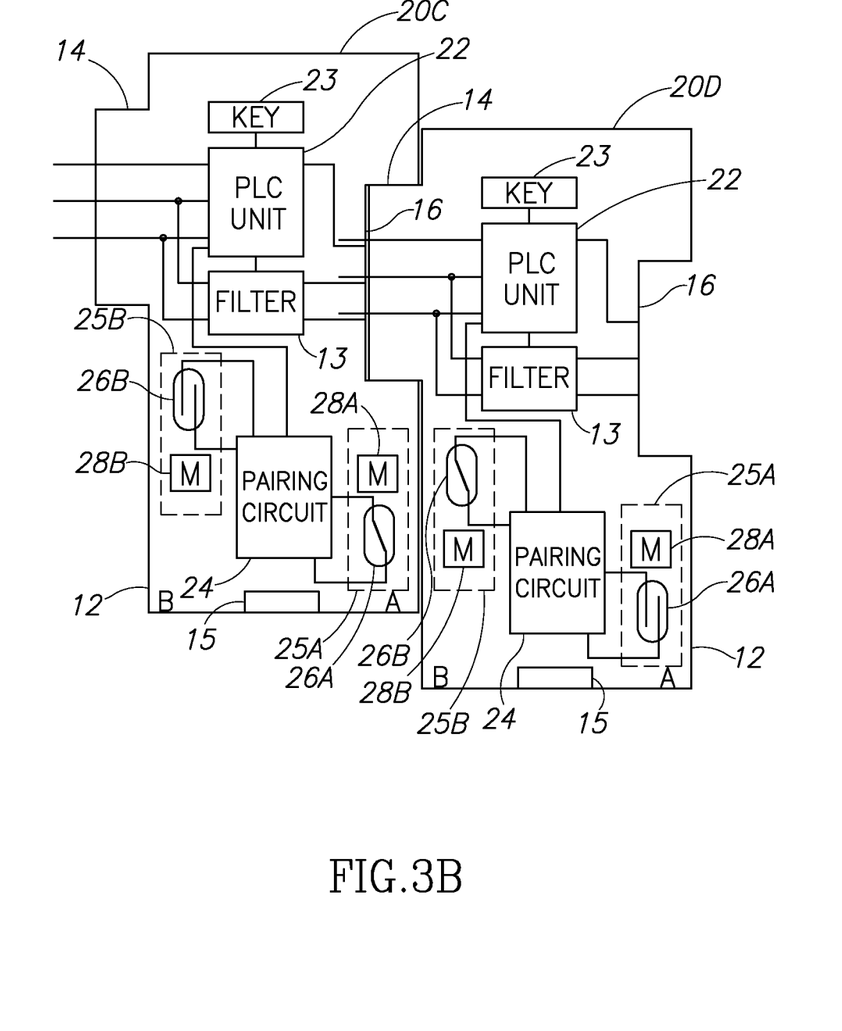
FIG. 3B is a schematic illustration of the two pass-through connectors of FIG. 3A upon connection.

Reference is now made to FIGS. 3A and 3B, which isometrically and schematically illustrate the pairing of two PLC units 20C and 20D, when connected to wall socket 18.

The embodiment of FIGS. 3A and 3B shows sensing units 25 each formed of one micro switch 26 and one magnet 28. Micro switch 26A and magnet 28A may be located in the A location, near a surface of housing 12 close to outlet 16, and micro switch 26B and magnet 28B may be located in the B location, near a surface of housing 12 close to plug 14.

Micro switches 26 may be any suitable micro switches, such as Reed switches (such as the Meder KSK-1A80 reed switches), which may close in the presence of a magnet. Thus, as shown in FIGS. 3A and 3B, if a PLC device 20D were to be plugged into a PLC device 20C which is plugged into wall socket 18, the magnets 28 of one device 20 may affect the micro switches 26 of the other device 20. Since PLC device 20C may be plugged into wall socket 18, it may act as the master unit while PLC device 20D, plugged into PLC device 20C, may act as the slave unit.

In particular, the A magnet of the inner device (PLC device 20C in FIG. 3B) may affect the B micro switch of the outer device (PLC device 20D in FIG. 3B) and the B magnet of the outer device may affect the A micro switch of the inner device. Thus, as shown in FIG. 3B, magnet 28A-C (i.e. magnet 28A of PLC device 20C) has closed micro switch 26B-D and magnet 28B-D has closed micro switch 26A-C.

It will be appreciated that the A location may be set to be "under" the B location when two devices 20 are connected together. The A magnet 28 may be placed so as to be under the B micro switch 26 and the B magnet 28 may be placed so as to be "over" the A micro switch 26 when the devices are connected together, such that the magnets 28 may strongly affect the micro switches 26.

Pairing circuit 24C on inner device 20C may determine that its micro switch 26A has been closed while pairing circuit 24D on outer device 20D may determine that its micro switch 26B has been closed.

It will be appreciated that the A location may indicate that the device 20 may be the inner device while the B location may indicate that the device 20 may be the outer device. The present invention may utilize this fact to perform the pairing operation.

Figure 3C:
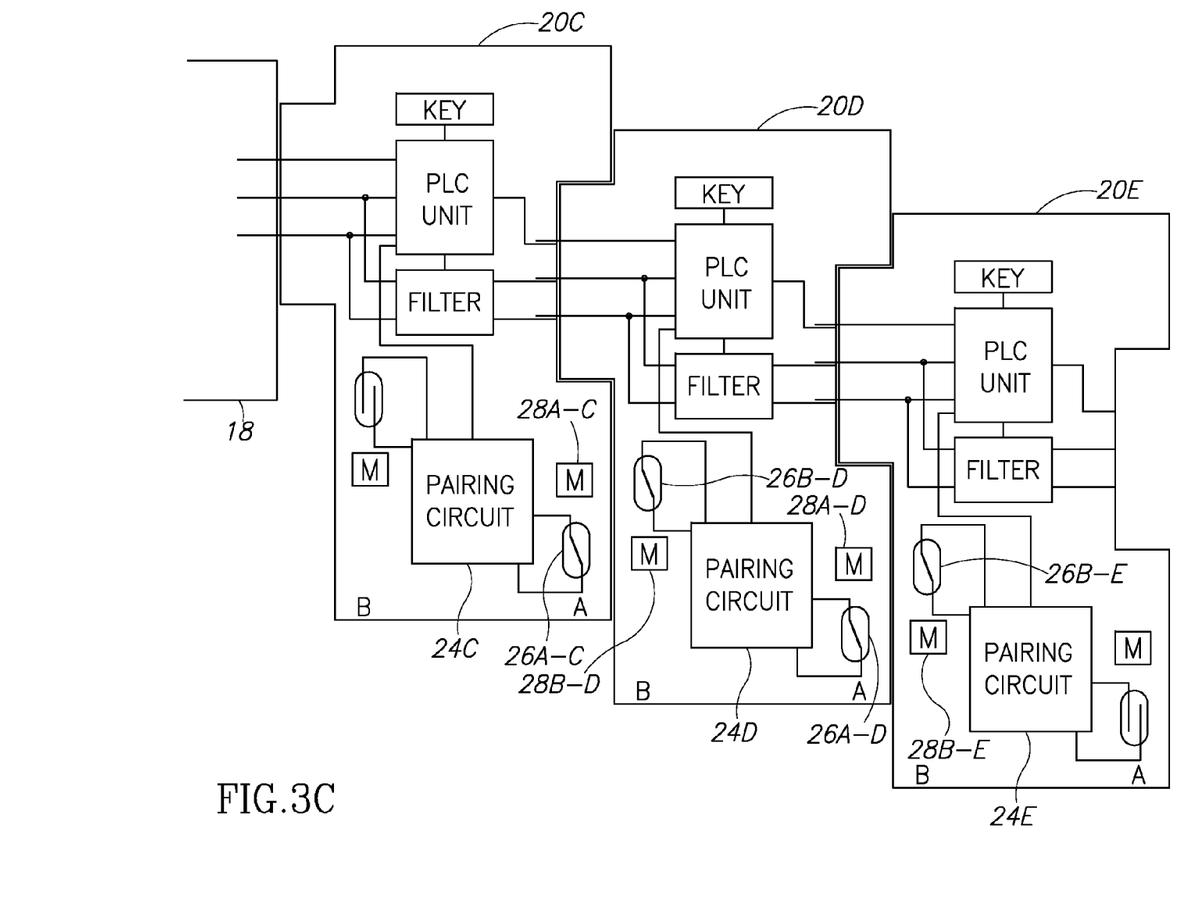
FIG. 3C is a schematic illustration of three connected pass-through connectors of FIG. 3A.

Reference is now made to FIG. 3C which illustrates the option to pair multiple devices by connecting multiple PLC devices to each other. Three devices 20C, 20D and 20E are shown, connected 20E to 20D, 20D to 20C and 20C to wall socket 18. Pairing circuit 24C may indicate that its switch 26A is closed, pairing circuit 24D may indicate that both its switches 26A and 26B are closed while pairing circuit 24E may indicate that its switch 26B is closed.

Given these indications, device 20C (whose pairing circuit 24C indicated that only switch 26A is closed) may act as the master, transmitting its pairing key to device 20D. Once device 20D has the key, it may act as master to device 20E.

Figure 4:
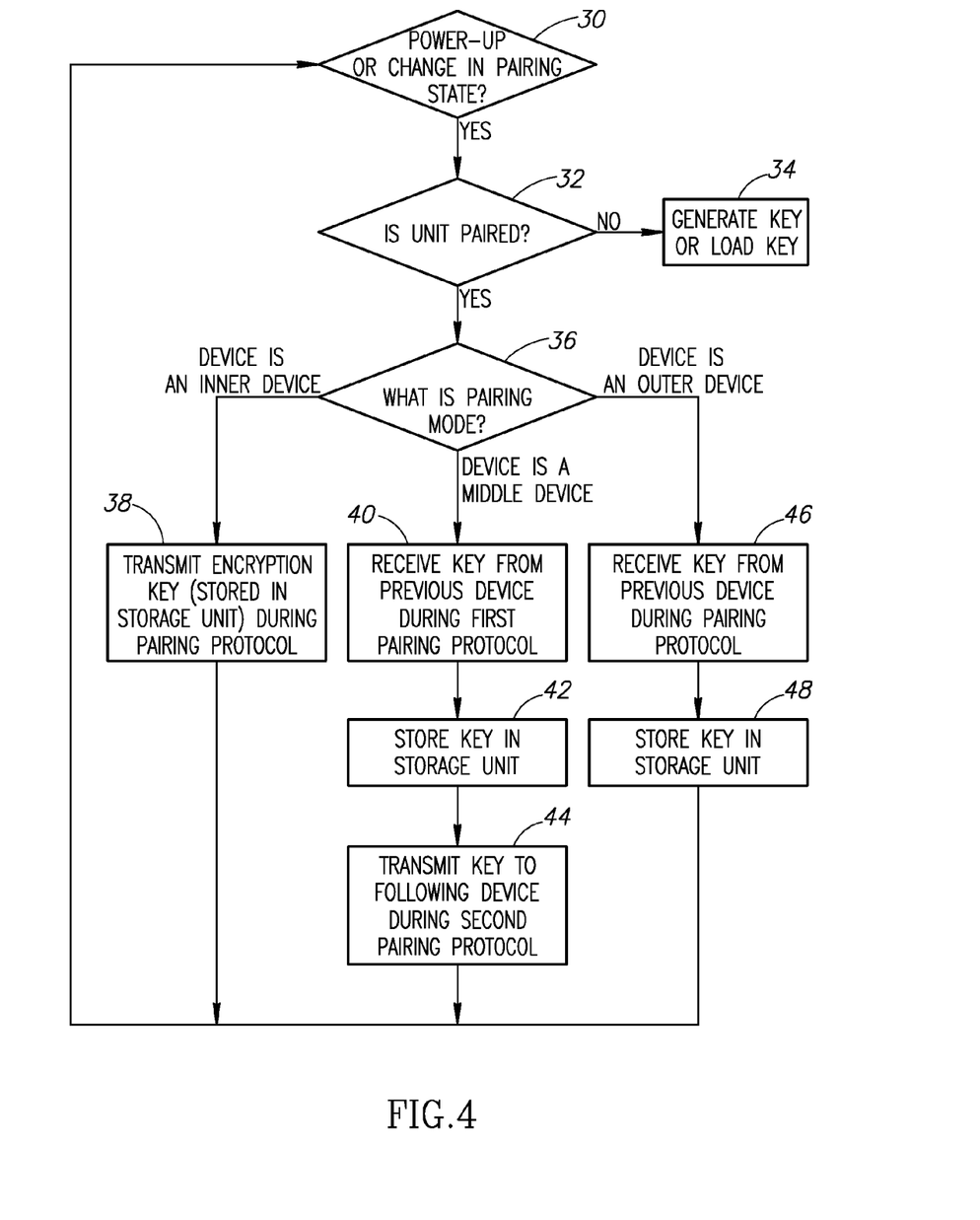
FIG. 4 is a flow chart illustration of a pairing process performed by each of the connectors when connected together as in FIGS. 3B and 3C.

Reference is now made to FIG. 4, which is a flow chart illustration of a set up to the pairing operation, performed by PLC devices 20 of the present invention. The pairing itself may be implemented through a standard pairing operation, such as the UKE (Unicast Key Exchange) protocol in HPAV. Upon power up (step 30), which occurs when each device 20 is first plugged in, or upon a change in the pairing circuit state, PLC unit 22 may check the output of pairing circuit 24. If the unit is unpaired (i.e. if pairing circuit 24 indicates that both switches 26 are open) as checked in step 32, then this indicates that the current device 20 is the first device of the network and thus, it may become the "master" of the new network. In which, case, PLC unit 22 may generate (step 34) a default key, which may be a unique encryption key based on the MAC (media access control) address of the PLC unit 22, and may store it, such as in storage unit 23. This may become the active key for the network. When PLC unit 22 may be re-plugged into the outlet (such as after power down), it may use the active key that is stored in its storage unit 23.

In step 36, the pairing mode is checked. If PLC unit 20 is the master (i.e. only micro switch 26A is closed, indicating an inner unit), PLC unit 20 may transmit (step 38) its network key (stored in key storage unit 23) to the unit currently paired to it during the pairing protocol. In one embodiment, the master may transmit the network key signal with a low power signal, directly between the units. The power level may be such that a unit that is far enough away (over 1 meter) will not be able to hear the signal. Even though the pass-through filter is designed to remove the PLC signals, since the two PLC units are so physically close, the network key signal may be strong enough that the filter cannot filter it out.

In another embodiment, the master may transmit a regular transmission, at a standard power level. This embodiment may assume that all of the units in the home network utilize the sensing mechanism described hereinabove and thus, may process the transmission of the key only when the sensing mechanism indicates that the unit is currently paired. Even if units on neighboring networks receive the transmission, they will not be able to decode it if they are not currently paired.

If PLC unit 20 is in the middle (i.e. both micro switches 26A and 26B are closed), then PLC unit 20 may listen (step 40) for the transmission of the key from the master unit during the pairing protocol and may store (step 42) the received key in its storage unit 23 once it has been received. This becomes its network encryption key, overriding its default key. Since PLC unit 20 is in the middle, it may also transmit (step 44) the newly received key to the next unit, during a second pairing protocol.

If PLC unit 20 is a slave unit (i.e. only micro switch 26B is closed, indicating an outer unit), then PLC unit 20 may listen (step 46) for the transmission of the key from the middle unit during the pairing protocol and may store (step 48) the received key.

It will be appreciated that, when the A sensor is activated, PLC unit 20 may act to transmit the key while when the B sensor is activated, PLC unit 20 may act to receive the key. PLC units 20 may ensure that they receive the key before transmitting it.

It will be appreciated that the procedure described hereinabove is user friendly. The user merely has to plug the master into an outlet and then to plug the remaining PLC units into the master. There are no timing requirements and no requirements to depress a switch.

It will be appreciated that the entire process comprises the following steps:

Connecting the units to the power network and to each other.

Pairing detection: the units may detect that they are attached.

Type recognition: each unit may recognize whether it is a inner unit, a middle unit or an outer unit.

Communication: the unit with A sensing unit active may communicate the active key to the unit with the B sensing unit active.

Setting: the unit with the B sensing unit active may overwrite its key with the received active key.

In another embodiment, a user may connect PLC units 20 together before plugging them into wall socket 18. PLC units 20 may power up at the same time and may determine if they are an inner, outer or middle unit. The inner unit may transmit the key and the middle and outer units may hear the transmission, all at generally the same time. Since the middle and outer units may have the B sensing unit active, they may wait until they enter the pairing protocol to receive the key. This embodiment may require that the transmission from the inner unit be of full power.

Figure 5:
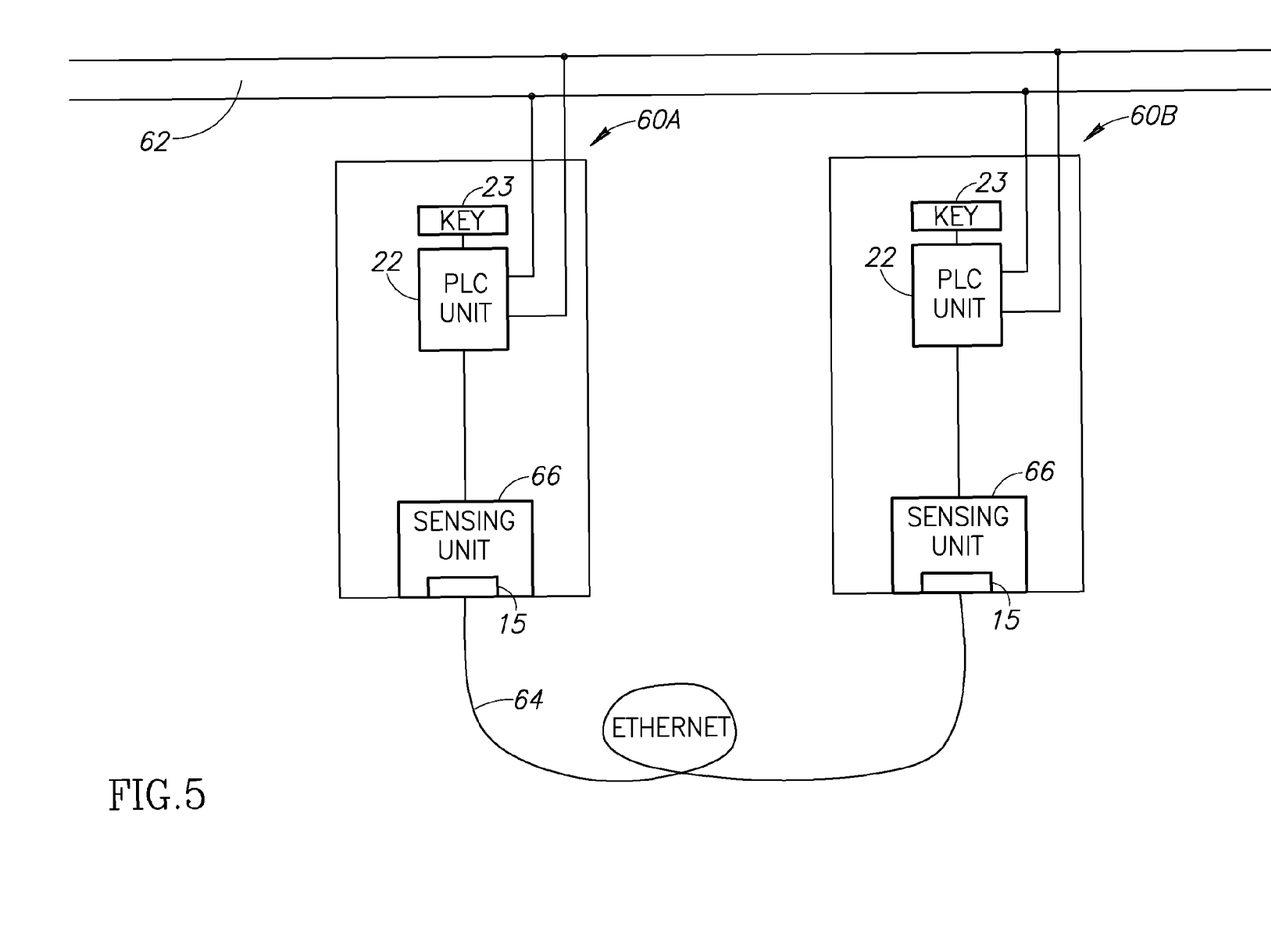
FIG. 5 is a schematic illustration of an alternative embodiment for pairing, utilizing a cable connection.

Reference is now made to FIG. 5, which illustrates an alternative embodiment of the present invention which also provides physical pairing of the devices, resulting in hands-free pairing of the devices. This embodiment may be simple, intuitive and secure and may require no additional hardware or user-interface elements. As a result, it may be suitable for retail and self-installation.

In FIG. 5, network devices 60 may be HPAV bridges or other devices connectable over some physical medium 62. For example, HPAV bridges are connectable over a powerline, while Bluetooth devices are connectable over the air. It is over physical medium 62 that devices 60 normally communicate. For powerline networks, devices 60 typically comprise PLC unit 22 and key storage unit 23.

In addition to physical medium 62, most networking devices also have a data connector, such as data connector 15, with which they connect to some data processing device, such as computing device 19 (FIG. 1B). For example, data connector 15 may be an Ethernet connector, connecting to an internal Ethernet port. In accordance with a preferred embodiment of the present invention, devices 60 may utilize an Ethernet cable 64 to connect together and to initiate the pairing protocol. In accordance with a preferred embodiment of the present invention, devices 60 may implement the pairing protocol over physical medium 62.

It will be appreciated that the topology of FIG. 5 is normally invalid in real-world networks since such a topology creates a loop in the network. However, in the present invention, PLC unit 22 may detect the loop created by cable 64 and may use its presence to identify that it is possible to initiate the pairing process.

Each PLC unit 22 may detect the presence of the loop in any suitable manner. For example, it may receive the MAC (media access control) address of the other device 60 twice, once from the powerline network and once from cable 64 (sent from the other device 60). In another example, one device 60 may send a packet along cable 64 to the other device 60 that only another device 60 is capable of parsing; computing device 19, which may normally be connected via connector 15, may be incapable of parsing such a packet.

In accordance with a preferred embodiment of the present invention, the communication channel created over cable 64 may be used to pass information useful to the pairing process directly between devices 60. As a result of the back channel created over cable 64, the pairing process may be more secure.

It will be appreciated that, as is common for most Ethernet connectors, data connector 15 may include a sensing unit 66 which may sense when cable 64 is connected therein. Sensing unit 66 may indicate such to PLC unit 22 which, when receiving such a signal, may initiate the pairing protocol.

For example, the embodiment of FIG. 5 supports pairing over physical medium 62 using a version of a standard protocol, such as the UKE (Unicast Key Exchange) protocol in HPAV. In such protocols, one device enters into an "add-state" in which it is prepared to accept pairing/join requests, while the second device enters into a "join-state" in which it requests to pair or join the network. When the network is in a state where one device is in add-state and another device is in join-state, the pairing occurs over the physical medium using a key exchange protocol.

In the present invention, the standard protocols may be extended by exploiting the additional communication channel provided by cable 64. In this extended model, shown in FIG. 6 to which reference is now made, one device 60, for example, device 60B, first detects (step 70) that it is not part of an existing network. When device 60B may detect a "LinkUp Event" indicating that its Ethernet link has come up (i.e. cable 64 has been plugged into its data connector 15), this may trigger the start of a pairing process, where the initial phases of the pairing may be performed over cable 64.

Figure 6:
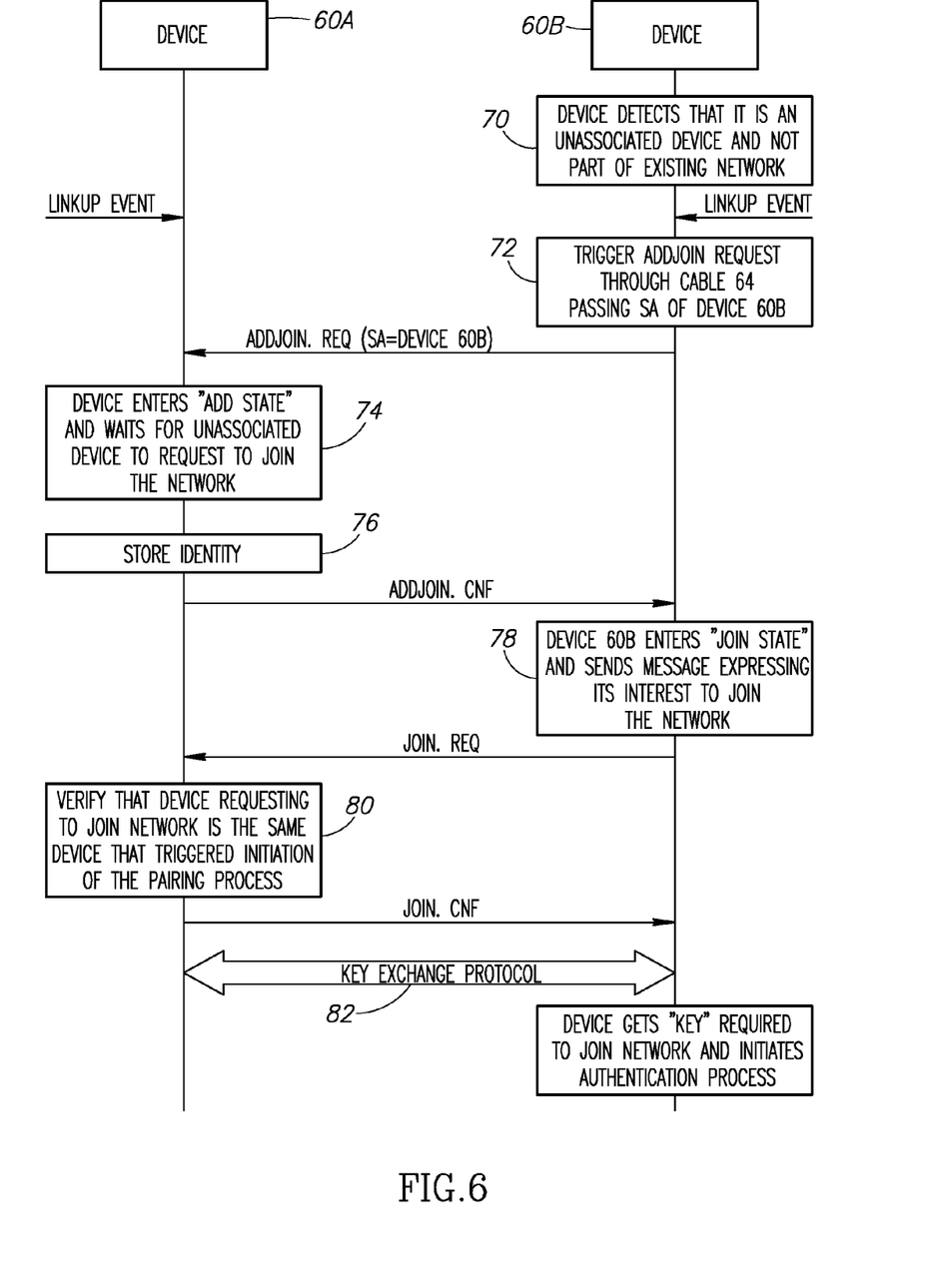
FIG. 6 is a transmission diagram illustration showing a method of utilizing the pairing elements of FIG. 5.

Device 60B may issue (step 72) an AddJoin.Req message through its data connector 15, specifying in the message its identity (e.g. its source address). Device 60A, upon receiving the request, may enter (step 74) into the add-state and may record (step 76) the identity of the device that triggered the pairing process. Device 60A may respond to device 60B with a confirmation message (AddJoin.Cnf) through its data connector 15.

Device 60A may now wait for the appearance of a "Join.Req" message over physical medium 62. In step 78, device 60B may enter the join-state and may issue the Join.Req message over physical medium 62.

Since, in the present invention, device 60A may know the identity of device 60B, which is requesting to join, when device 60A receives the Join.Req message, it may verify (step 80) that the device sending the request over physical medium 62 is the same device that triggered the initiation of the pairing process over cable 64. If the device requesting to join is not the same device, device 60A may reject the pairing request. Otherwise, the two devices may enter the standard key exchange protocol (step 82) such that device 60B may receive (step 84) the network key. The pairing process typically may terminate once a device joins the network or after a timeout period.

It will be appreciated that, since device 60A may verify the device requesting the pairing, the process may be more secure and may ensure that devices outside the network cannot unintentionally join.

In an alternative embodiment, devices 60A and device 60B may finalize the pairing process by passing the network key along cable 64 rather than along physical medium 62.

It will be appreciated that cable 64 may be utilized to pair non-powerline devices as well. For example, any medium where security is required, such as wireless, Bluetooth, etc, and where the devices have data connectors, similar to data connectors 15, in addition to the communication along their physical medium, may implement the key exchange protocol described hereinabove using cable 64.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for pairing a first power line communication (PLC) device with a second power line communication device, the method comprising:
   said first PLC device triggering a pairing initiating state responsive to sensing a connection of a data cable with said second PLC device;
   entering an appropriate pairing initiation state, said pairing initiation state being either an add device state or a join device state; and
   performing pairing with said second PLC device;
   wherein said first PLC device in said join device state passing an identifier to said second PLC device in said add state over said data cable and said second PLC device in said add state agreeing to said performing pairing only with said first PLC device having said identifier.

2. The method according to claim 1 wherein said data cable is an Ethernet cable.

3. The method according to claim 1 further comprising passing a network key along said data cable from said second PLC device to said first PLC device.

4. A power line communication device (PLC) comprising:
   a power line communication unit;
   a sensor to sense a data cable connection with a second PLC device; and
   a pairing unit to enter an appropriate pairing initiation state upon triggering of a pairing initiating state responsive to receiving an indication from said sensor, said pairing initiation state being either an add device state or a join device state;
   wherein said pairing unit comprises a data unit to pass along said data cable an identifier of said PLC device, if said power line communication device is in a join device state, or said data unit to receive an identifier of said second PLC device, if said power line communication device is in an add state.

5. The power line communication device according to claim 4 wherein said data cable connection is an Ethernet cable connection.

6. The power line communication device according to claim 4 and wherein said sensor is an Ethernet link sensor.

* * * * *